April 21, 1959 L. E. LEE 2,882,930
FLUID OPERATED VALVE
Original Filed Jan. 20, 1954 2 Sheets-Sheet 1

INVENTOR
LUTHER E. LEE

BY
ATTORNEYS

April 21, 1959 L. E. LEE 2,882,930
FLUID OPERATED VALVE
Original Filed Jan. 20, 1954 2 Sheets-Sheet 2

INVENTOR
LUTHER E. LEE

BY
ATTORNEYS

United States Patent Office 2,882,930
Patented Apr. 21, 1959

2,882,930

FLUID OPERATED VALVE

Luther E. Lee, Takoma Park, Md.

Original application January 20, 1954, Serial No. 405,267. Divided and this application January 18, 1955, Serial No. 482,683

3 Claims. (Cl. 137—620)

(Granted under Title 35, U.S. Code (1952), sec. 266)

The invention described herein may be manufactured and used by or for the Government of the United States of America for governmental purposes without the payment of any royalties thereon or therefor.

The instant application is a division of application Serial No. 405,267, filed by Luther E. Lee on January 20, 1954, for Machine Tool.

The present invention relates to valves and more particularly to a valve particularly well adapted for use with a machine tool such, for example, as that disclosed in the aforementioned application Serial No. 405,267 for turning and chasing operations and for supplying a concentrated directed stream of high velocity pressure fluid onto a cutting tool or within the proximate vicinity thereof during cutting operations.

It is contemplated by this invention that a valve of novel construction be provided for controlling the flow of a relatively high pressure directed fluid coolant projected from an appropriately located nozzle to an area immediately proximate the cutting edge of the working tool and the work, thereby providing appreciably greater tool life and higher rates of metal working and thus contributing to increased production and greater economy.

An object of the present invention is to provide a new and improved valve suitable for use with a machine tool such, for example, as a lathe.

Still another object of this invention is to provide a novel valve system to control selectively the flow of fluids in a hydraulic system.

A further object of this invention is to provide a novel valve for controlling the flow of a relatively high pressure fluid coolant on or within proximate relation with respect to a cutting tool thereby to increase the life of the tool and to produce higher rates of metal working.

Still another object of this invention is to provide in a machine tool, a lathe component capable of assisting in directing and controlling automatically the operation of a lathe for selective turning or chasing movement.

Figure 1:
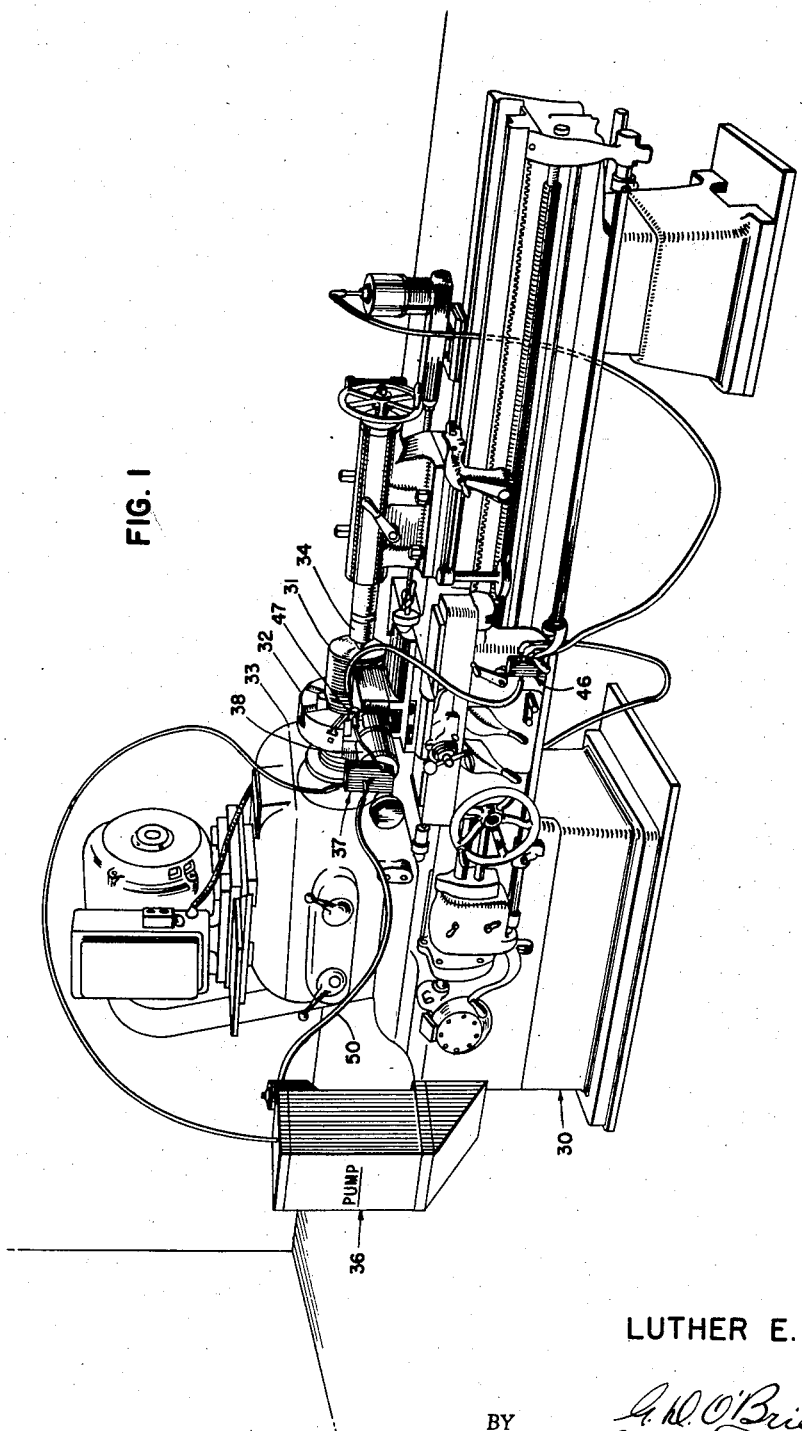
Figure 2:
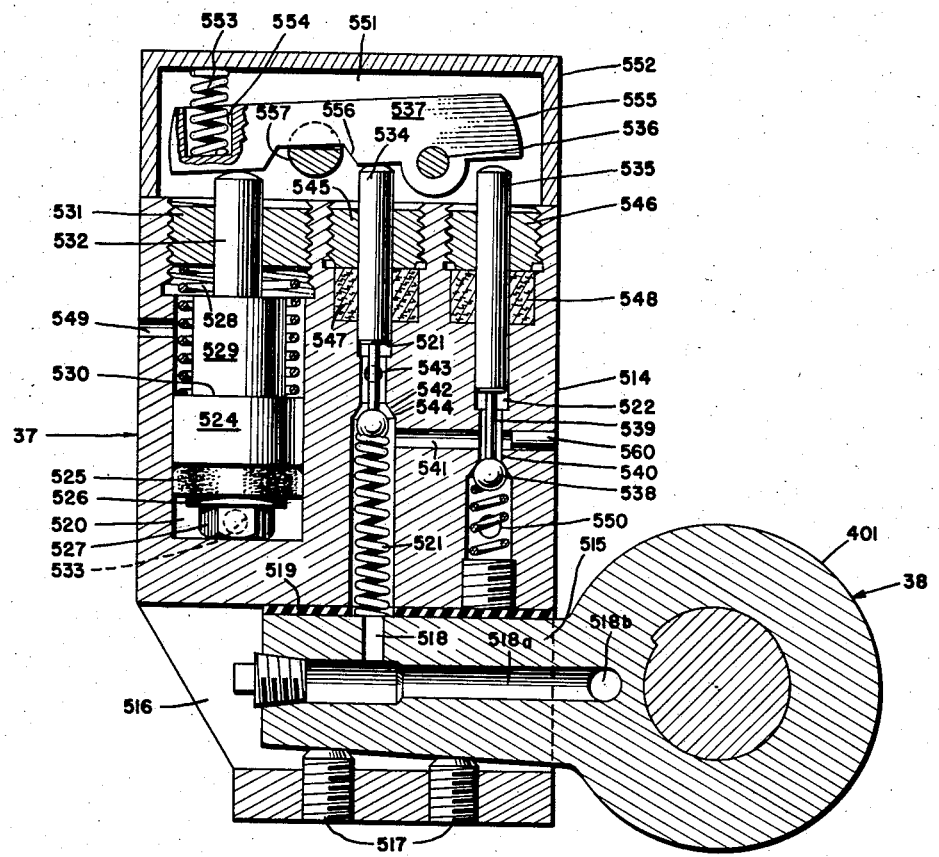

Other objects and many of the attendant advantages of this invention will be readily appreciated as the same becomes better understood by reference to the following detailed description when considered in connection with the accompanying drawings wherein:

Fig. 1 is a perspective view of an engine lathe embodying the present invention; and Fig. 2 is an enlarged detailed sectional view of the fluid operated control valve mounted on the turning and chasing head of a lathe.

Referring to the drawings, and particularly to Fig. 1 wherein one embodiment of the present invention is illustrated attached to an engine lathe 30 of any suitable construction in which a workpiece 31 is supported between the chuck 32 mounted on the head stock 33 and the center 34 on the tailstock 35. The lathe may broadly comprise a toolholder and a pump 36 designed to develop a relatively high pressure and to deliver a fluid at high pressure through the system of the present invention including conduits and control valves to a nozzle assembly mounted on the toolholder, the nozzle assembly being constructed and arranged so as to direct high pressure fluid adjacent the cutting surfaces of a cutting tool at a high velocity and a pressure in excess of 450 p.s.i. to provide and maintain a cooling effect along the vital tool surfaces by removing the generated heat with sufficient promptness to prevent any appreciable heat effects that might injure either the tool or the work being operated upon by the tool.

The turning and chasing head 38 supports the control valve 37 of the present invention, the latter being interposed in the fluid transmitting line 50 leading from the pump 36 to the toolholder head 38 which, in turn, serves as a conduit to pass the pressure fluid to the nozzle assembly. When the internal mechanism of the valve 37 is conditioned to permit flow therethrough fluid under pressure will: (1) supply hydraulic pressure within the body of the head sufficient to project a ram on which the toolholder is mounted into the workpiece 31, and (2) supply pressure fluid to the nozzle assembly through the head 38 as more fully shown and described in the aforementioned application Serial No. 405,267.

The aforesaid power operated toolholder head 38 is an improvement on the power operated toolholder of the present invention described in U.S. Patent No. 2,641,151, and is completely described in application Serial No. 405,267.

Broadly the turning and chasing head comprises a housing 401 within which there is a chamber for receiving a fluid under pressure from pump 36 and via valve 37 to advance a ram that supports a toolholder and its toolbit and nozzle assembly, into a workpiece.

The turning and chasing head control valve assembly 37 is mounted on the projection 515 of the head 38 to control the admission and exhaust of the high pressure fluid from the pump to the head, the head structure being fully shown and described in application Serial No. 405,267. The housing 514 of the valve has a clamping recess 516 through which the bolts 517 are passed to engage the head projection 515 to maintain the valve in position over the fluid passage 518 in the projection 515 of head 38. Gasket 519 in the recess prevents fluid leakage before entry to the toolholder head. The interior of the valve housing body is bored to provide three cylinders 520, 521 and 522, therein. The cylinder 520 slidably retains the actuating piston 524 which has a fiber disc 525 and washer 526 fastened to the piston head by a bolt 527. Spring 528 encircles a reduced section 529 of the piston and abuts against the shoulder 530 and the bushing 531 which is threaded into the cylinder opening and urges the piston 524 and the plunger 532 in the downward direction whereupon the piston is maintained in an initial position, as shown in Fig. 2. The inlet passage 533 leading into the cylinder 520 admits a low pressure actuating medium, such as air, which will slide the piston upwardly to actuate the valve to an open operating position, Fig. 2 illustrating the closed position of the value. A vent port 549 through the housing relieves any back pressure on the shoulder side 530 of the piston. Plungers 534 and 535 slidable in cylinders 521, 522, respectively, are disposed laterally with respect to the pivot point 536 on which the rocker arm 537 is retained. A spring loaded ball check valve 538 engages and normally urges the reduced stem 539 of the plunger 535 in the upward direction in proximate relation with respect to the rocker arm 537 and also maintains the check valve in contact with a seat bordering on inlet section 540 thereby closing the reduced fluid inlet section 540 to the cylinder 522 that leads to the interconnecting passage 541 and adapted to open the inlet section 540 as the rocker arm is actuated, a plug 560 being disposed within the passage 541 to seal one end of the passage. Intermediate the cylinders 520 and 522 is the cylinder 521 in which the pressure relief plunger 534 is normally urged in the upward direction in engagement with rocker arm 537 by the spring loaded ball check valve 542, the check valve 542 being normally open and maintained in an open position by plunger 534 having one end thereof in engagement with valve 542 and the other end thereof in engagement with rocker arm 537 and adapted to close the relief passage port 543 at the reduced section 544 of the cylinder 521 at a point spaced vertically above the interconnecting passage 541 subsequent to the opening of valve 538. Bushings 545, 546 and packing glands 547, 548 retain the plungers 534, 535, respectively, in position within the cylinders 521, 522. The passage 541, and the toolholder inlet passages 518, 518a and 518b in the projection 515 on the chasing head, are interconnected through the lower portion of control valve cylinder 521 to pass fluid into the head chamber. Inlet port 550 in the wall of cylinder 522 and the relief port 543 in the wall of cylinder 521 when conditioned by the position of the rocker arm will admit or exhaust fluid in the toolholder head. A rocker arm 537 is pivotally disposed above the plungers in the cavity 551 formed in the cover plate 552 and is urged counterclockwise by the spring 553 retained within the recess 554 in the toe of the rocker arm. Heel 555 of the rocker arm is disposed directly above the inlet plunger 535 and the intermediate forward section 556 of the arm is directly over the relief plunger 534.

When low pressure fluid is admitted through inlet 533 into the cylinder 520 the piston 524 will be moved upwardly to rotate the rocker arm 537 clockwise about the pivot 536 thereby engaging the plunger, forcing the plunger 535 downwardly to unseat ball check 538 to admit high pressure fluid from the pump which fluid will enter through the inlet 550 and flow into the passage 541 about the reduced stem 539; and the high pressure fluid will continue to flow through the lower portion of cylinder 521 and into the passage 518 in the projection 515 that leads to the head chamber. It will be understood that during the flow of fluid through the aforesaid passage 541 and into the chamber in housing 401, valve 542 is closed, having been closed prior to the opening of valve 538 in response to the rotation of the rocker arm and thus sealing port 543 and preventing the escape of fluid therethrough. As the low pressure fluid is cut off and the pressure in the cylinder 520 is reduced, having been exhausted from the cylinder 520 through a selector valve 46 (Fig. 1), via port 533, the spring 528 forces the piston 524 down to its initial position and concurrently therewith rocker arm 537 is rotated about its pivot in a counterclockwise direction by spring 553 to its initial position, the spring 553 also assisting in returning the piston 524 to the initial position. As the rocker arm 537 is pivoted counterclockwise by spring 553 to the initial position the heel 555 disengages plunger 535 and permits the plunger 535 to be elevated by the spring loaded ball check valve 538 and allows the check valve to move to its initial seated position, Fig. 2, thereby cutting off pressure fluid supply to the head. During such movement of the rocker arm the intermediate section 556 thereof contacts the plunger 534 which depresses the spring loaded check valve 542 to permit the return of the pressure fluid in the head through the relief port 543 to the pump 36.

Manual opening and closing of the control valve 37 may be controlled by the slotted stud 557 inserted into the side of the housing and which slot is positioned beneath the intermediate section 556 on the rocker arm. Upon rotation of the stud 557 by a suitable thumb head (not shown), approximately 90° the rocker arm will be pivoted to depress the plunger 535 thereby manually opening the valve to the high pressure fluid from the pump.

From the foregoing, it will be apparent that a valve of novel construction has been devised for use with a turning and chasing head of a lathe wherein valves actuated in response to rotation of a piston operated rocker arm control the admission and exhaust of high pressure fluid from the pump to the head such that a relatively high pressure fluid coolant may be projected from an appropriately located nozzle to an area immediately proximate the cutting edge of the working tool and the work. Thus appreciably greater tool life and higher rates of metal working as well as increased production and greater economy result.

Obviously many modifications and variations of the present invention are possible in the light of the above teachings. It is therefore to be understood that within the scope of the appended claims the invention may be practiced otherwise than as specifically described.

What is claimed is:

1. The combination of a fluid control valve and a turning and chasing head for use with a power operated tool comprising a housing having a piston chamber and a pair of plunger chambers therein, a fluid operated piston mounted within said piston chamber and movable from an initial position to an actuating position, means disposed within said piston chamber in engagement with said piston and the housing for maintaining the piston in said initial position, and for returning said piston from said actuating position to said initial position, a normally closed spring urged check valve disposed within one of said pair of plunger chambers, a normally open spring urged check valve disposed in the other one of said pair of chambers, a rocker arm pivotally mounted in said housing, a first actuating plunger slidably disposed within said one plunger chamber and having one end in engagement with said normally closed spring urged valve and the other end thereof in spaced relation with respect to said rocker arm, said plunger being actuated in response to rotation of said rocker arm to move said normally closed spring urged valve to an open position, a second actuating plunger slidably disposed within the other one of said pair of chambers and having one end in engagement with said normally open spring urged check valve and the other end thereof in engagement with said rocker arm for maintaining said normally open check valve in said open position, said second actuating plunger allowing said normally open check valve to move to a closed position prior to movement of the normally closed valve to said open position in response to said rotation of the rocker arm, means on said fluid operated piston in engagement with said rocker arm and movable therewith for rotating said rocker arm from said initial position to said actuating position, resilient means in engagement with said rocker arm and housing for maintaining the rocker arm in said initial position and spaced from said first actuating plunger, in engagement with said second actuating plunger and with said rocker arm rotating means on the fluid operated piston, and manual operating means rotatably mounted on said housing and cooperating with said rocker arm for adjusting the rocker arm with respect to said first plunger, the second plunger, and the means on the piston for rotating the rocker arm to said actuating position thereby to control the amount of fluid pressure passing into the head.

2. The combination of a fluid control valve and a turning and chasing head for use with a power operated tool comprising a casing having a piston chamber and a pair of plunger chambers therein, a fluid operated means slidably mounted in said piston chamber and movable from an initial position to an actuating position, means disposed within said piston chamber in engagement with said fluid operated means and casing for maintaining the fluid operated means in said initial position, normally closed spring urged means disposed within one of said pair of chambers, normally open spring urged means disposed within the other one of said pair of chambers, means pivotally mounted in said casing and movable from an initial position to an actuating position, means carried by said fluid operated means in engagement with said pivoted means for moving said pivoted means to said actuating position, first means slidably disposed in one of said pair of chambers in engagement with said normally closed spring urged means, second means slidably disposed in the other one of said pair of chambers having one end in engagement with said pivoted means and the other end thereof in engagement with said normally open spring urged means for maintaining said spring urged means in an open position, means on said pivoted means and spaced from said first slidable means for moving said normally closed spring urged means to an open position as said pivoted means is rotated about its pivot, additional means on said pivoted means and normally in engagement with said second slidable means for maintaining said normally open spring urged means in an open position and for allowing said normally open means to move to a closed position prior to movement of said normally closed means to an open position in response to said rotation of pivoted means, means on said fluid operated means in engagement with said pivoted means and movable therewith for rotating said pivoted means from said initial position to said actuating position, resilient means in engagement with said pivoted means and casing for maintaining said pivoted means spaced from said first slidable means, in engagement with said second slidable means and with said rotating means on the fluid operated means, and manual operating means rotatably supported on said casing and cooperating with said pivoted means for adjusting said pivoted means with respect to said first slidable means, the second slidable means, and the means for moving said pivoted means to said actuating position thereby to control the amount of fluid pressure passing into the head.

3. The combination of a fluid operated valve and a turning and chasing head for use with a power operated tool comprising a housing having a plurality of independent chambers therein, a low pressure actuatable piston slidably disposed within one of the chambers and movable from an initial position to a plunger operating position, means in engagement with said piston and housing for yieldably maintaining said piston in said initial position, means defining a low pressure fluid inlet passage in fluid communication with the lower end of said piston, a rocker arm disposed above the chambers, an inlet plunger slidably disposed within a second chamber and in spaced relation with respect to the other end of the rocker arm, a relief plunger slidably disposed within a third chamber in engagement with an intermediate portion formed on the rocker arm, means for pivotally connecting the rocker arm to the housing substantially between the plungers, a normally closed ball check valve disposed within said second chamber in engagement with said inlet plunger, resilient means in engagement with said ball check valve for maintaining said valve in a closed position and said inlet plunger in spaced relation with respect to said other end of the rocker arm, a normally open ball check valve disposed within said third chamber in engagement with one end of said relief plunger, yieldable means in engagement with said normally open valve for maintaining said check valve in engagement with said one end of said relief plunger and the other end thereof in engagement with said intermediate portion of the rocker arm, resilient means in engagement with said rocker arm and housing for yieldably maintaining one end of said rocker arm in engagement with said piston, the intermediate portion in engagement with said relief plunger and the other end thereof in spaced relation with respect to said inlet plunger, means defining a high pressure fluid inlet passage in the second chamber containing said inlet plunger and disposed below the inlet plunger, means defining a high pressure fluid outlet passage in the third chamber whereby the actuation of said low pressure piston from said initial position to a plunger actuating position operates said rocker arm to close said normally open check valve and open said normally closed check valve and establishes fluid communication between the high pressure inlet and outlet passage, manual operating means rotatably supported on said housing and cooperating with said rocker arm for adjusting the rocker arm with respect to said inlet plunger, relief plunger, and the low pressure piston thereby to control the amount of high pressure passing through said outlet passage and into the head, and means defining a relief port in said third chamber disposed above said outlet passage and the passage connecting said second and third chambers whereby the actuation of said low pressure piston by the yieldable means from a plunger actuating position to said initial position establishes fluid communication between said outlet passage, relief port and the passage connecting the second and third chambers.

References Cited in the file of this patent

UNITED STATES PATENTS

| 1,521,382 | McPherson | Dec. 30, 1924 |
| 1,588,659 | Christensen | June 15, 1926 |
| 1,644,093 | Shonnard | Oct. 4, 1927 |
| 2,092,364 | Stevens | Sept. 7, 1937 |
| 2,216,925 | Schofield | Oct. 8, 1940 |
| 2,232,038 | Stone | Feb. 18, 1941 |
| 2,280,345 | Nickells | Apr. 21, 1942 |
| 2,417,278 | Van Der Werff | Mar. 11, 1947 |
| 2,622,565 | Venus | Dec. 23, 1952 |

FOREIGN PATENTS

| 997,725 | France | 1951 |
| 144,529 | Sweden | Mar. 16, 1954 |